Oct. 23, 1923.
H. M. HOLT
1,472,003
AUTOMOBILE TOWING FRAME
Filed April 12, 1922
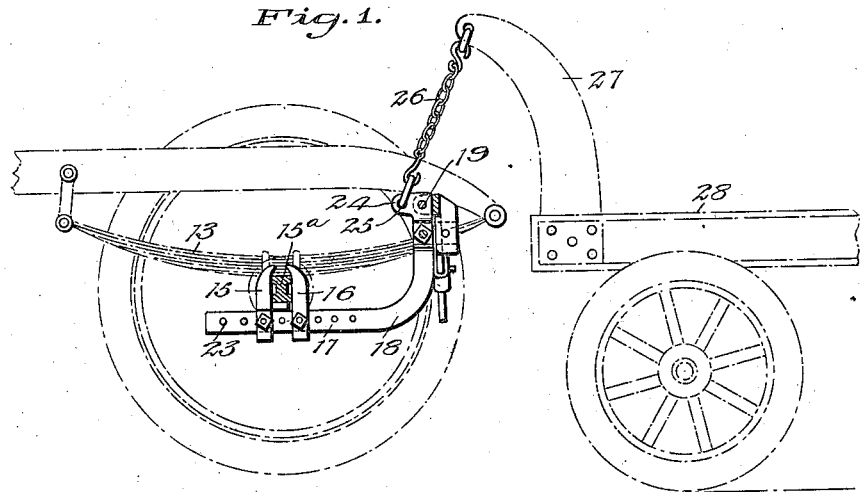
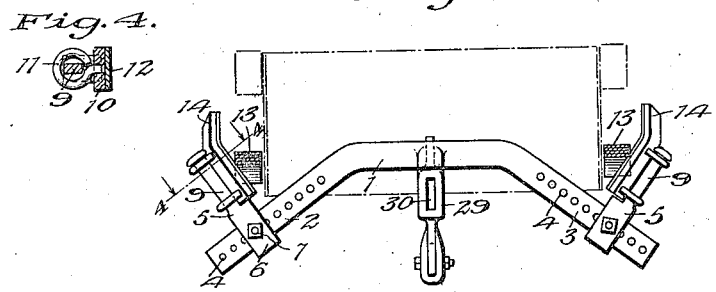
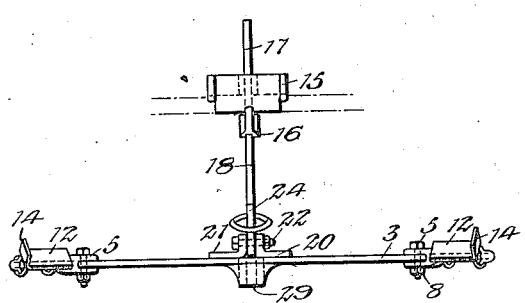
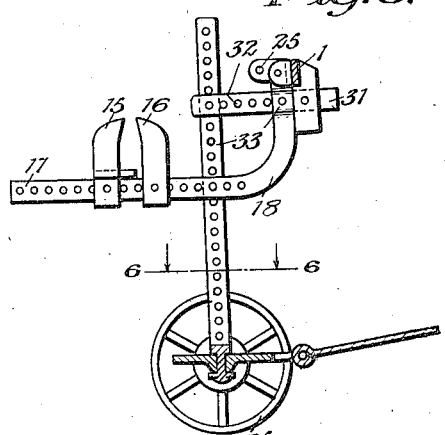
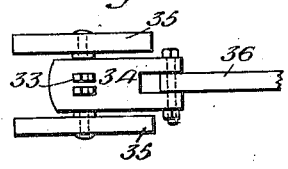
WITNESSES
INVENTOR
Henry M. Holt
BY
ATTORNEYS Patented Oct. 23, 1923.

1,472,003

UNITED STATES PATENT OFFICE.

HENRY M. HOLT, OF NEW YORK, N. Y.

AUTOMOBILE TOWING FRAME.

Application filed April 12, 1922. Serial No. 551,859.

*To all whom it may concern:*

Be it known that I, HENRY M. HOLT, a citizen of the United States, and a resident of the city of New York, borough of Manhattan, in the county and State of New York, have invented a new and Improved Automobile Towing Frame, of which the following is a full, clear, and exact description.

This invention relates to an automobile towing frame, and has for an object the provision of a frame which can be quickly and easily applied to an automobile, preferably at the front or the rear, to engage beneath the springs and the axle and, merely by reason of the forces exerted to lift the end of the automobile or to tow the automobile, is very positively and firmly held against the parts with which it is contacting.

Another object resides in the provision of means whereby this frame can be readily adjusted to fit various sizes of vehicles.

A further object resides in the provision of means whereby the frame can be applied to any vehicle easily and quickly and in such manner as not to damage or deface the parts of the vehicle with which it contacts.

A still further object resides in the provision of means whereby heavy vehicles as well as lighter ones can be readily towed.

Another object resides in the particular construction and arrangement of parts which are hereinafter described and claimed and shown in the accompanying drawings.

The invention is illustrated in the drawings, of which—

Figure 1 is a side elevation of the end of a vehicle to which the frame has been attached and showing this end of the vehicle lifted from the ground and carried from a wrecking car.

Fig. 2 is a front view of the frame attached to a vehicle.

Fig. 3 is a plan view of the frame.

Fig. 4 is a section taken on the line 4—4 of Fig. 2.

Fig. 5 is a side elevation of a modified form of towing frame.

Fig. 6 is a section taken on the line 6—6 of Fig. 5.

The forms of the invention shown in the drawings are preferred forms, although it is understood that modifications in the construction and arrangement of the parts and in the character of the materials used may be adopted without departing from the spirit of the invention.

The frame constituting my invention, and of which the preferred forms are shown in the drawings, comprises a cross yoke bar having a central, substantially horizontal portion 1 and end portions 2 and 3 which are bent down at any suitable angle and provided with a series of holes such as 4 therein. These end portions are bent down so that when the spring rest brackets 5 are attached thereto these brackets and the ends of the cross yoke bar will be substantially at right angles to each other. These brackets are preferably constructed in the form of a metal loop 6 adapted to embrace the ends of the cross yoke bar, and provided with apertures to be alined with any one of the apertures 4. The brackets may be adjusted in any definite position and maintained in this position by any suitable means, such as bolts 7 and nuts 8 passing through the alined apertures. The upper ends of the brackets are constructed in the form of stems 9 with relation to which the actual spring rest plate 10 is disposed. From this spring rest plate 10 means such as eyes or loops of metal 11 extend and embrace the stem 9 whereby the rest plates 10 are held with respect to the stem but can, if necessary, be slidable therealong. The face of each of the rest plates 10 is provided with a lining such as 12 of any suitable fabric to prevent the defacement of the springs 13 with which these rest plates engage. It will be noticed that the main portion of the rest plates is parallel to the stem 9 but that the upper portion is bent vertically, as indicated by the numeral 14. This inclination of the rest plates is provided so that when the vehicle has splash pans or other similar constructions, these constructions will not be crushed as might be the case if the spring rests were made straight and flat instead of having a downward inclination. By providing means whereby each of the spring rest contacts can be adjusted along the length of the ends of the cross yoke bar, I make this device one which can be applied to vehicles having different widths between the chassis members or springs with which the frame members contact.

I also provide axle clamping plates, such as 15 and 16, the ends of which are adapted to be adjusted in a manner similar to the adjustment of the brackets 5 along the end 17 of what I designate as the axle pulling member 18. This axle pulling bar or member extends substantially horizontally beneath the axle and then is bent upwardly to be pivotally connected as at 19 to the cross yoke bar. The yoke bar is shown as provided with angle plates 20 and 21 between which the upper end of the axle pulling bar extends and to which it is pivotally fastened by any suitable means, such as a bolt and nut 22. Holes 23 disposed along the length of the end of the axle pulling bar 18 permit the adjustment of the clamping plates 15 and 16 thereon in accordance with the size of axle or other portion of the vehicle chassis with which these plates are adapted to engage.

The upper end or the axle pulling bar, which I may designate as the longitudinally extending bar, as distinguished from the cross yoke bar, is provided with a portion such as 24 extending slightly rearward of the pivot point 19; and to this extension, by means of an aperture 25, any suitable means, such as a chain 26, may be connected for the purpose of pulling the vehicle, if it is being towed, or for the purpose of lifting the vehicle off the ground if the chain, as shown in Fig. 1, is connected to the rear frame 27 of another vehicle such as 28. Other means than the chain 26 and the aperture 25 can, of course, be used, the generic idea of the invention being that the connection to the towing frame of the force pulling or lifting the vehicle is made at a point between the vertical lines passing through the pivot point 19 and the axle 15ª. The reason for this particular location of the connection as above mentioned is that when the pull is exerted here the tendency is not only to hold the cross yoke member firmly beneath the end of the chassis of the vehicle but also by a lever action to hold the rear end of the longitudinally extending bar firmly against and in engagement with the axle. This function causes the frame to be tightly held in place without any further means of fastening it to the vehicle against which it is bearing than the pull exerted through said connection. Therefore, the greater the pull the tighter will the frame be held against the end of the vehicle.

The modification of the invention shown in Figs. 5 and 6 comprises the attachment to the above-mentioned frame of means whereby heavy trucks can be towed without supporting their ends in the manner shown in Fig. 1. This modified form of the invention comprises the axle pulling bar 18, the cross yoke bar 1 and the axle clamping plates 15 and 16. The cross yoke bar is further provided, as shown in Fig. 2, with a dependent bracket 29 having a slot 30 therein. Through this slot 30 a space bar 31 extends. This bar 31 also extends through a similar slot formed in the upper end of the member 18 in alinement with the slot 31. Suitable holes such as 32 are provided in the bar 31 whereby the bolt and nut fastening means previously mentioned can be used to hold the various parts together. Any other suitable means can be used to fasten these parts together, such as split eye bolts. The rear end of the space bar 31 is in the manner described fastened to the desired portion of a vertically extending bar 33 mounted on a wheel truck platform 34 provided with wheels 35 and a towing handle 36. This vertical bar is also fastened to an intermediate point of the axle pulling bar or member 18 so that the weight of the vehicle through the towing frame on which it is supported is borne by the bar 33 at its intermediate point. This point of support lying between the vertical lines passing through the axle and the cross yoke pivot point will function in a manner similar to that previously described so that the towing frame will be held tightly against the vehicle. In order to convert the device shown in Fig. 5 to the one shown in Fig. 1, it is merely necessary to remove the connection between the bar 31, the member 18, the bar 33, and then to remove the bar 31 from the guides through which it passes. This can be done in a few minutes.

This towing device has been proven by actual practical use to be highly efficient and to be capable of attachment in less than a minute to the ordinary passenger car. It holds the car firmly at all times as long as there is any stress exerted between the frame and the vehicle and holds the frame firmly without any danger of slipping by the vehicle. It is evident that it can be attached to any vehicle with a minimum liability of defacement of the parts with which it contacts. The fact that the point of support between the towing frame and the device through which the towing force is being exerted is located as above described enables the axle pulling bar 18 to be lifted up at all times firmly against the axle so that all parts cling tightly to the automobile.

What I claim is:

1. An automobile towing frame which comprises a cross yoke bar extending transversely of the machine at the end thereof, an adjustable supporting member at each end of said cross yoke bar to engage with the sides of the automobile, a longitudinally extending member connected to the cross yoke bar, said longitudinally extending member extending under the axle, clamping plates on said longitudinally extending member adapted to engage the axle, and means for connecting the towing apparatus to the frame at a point between the cross yoke bar and the inner end of the longitudinally extending member.

2. An automobile towing frame which comprises a transversely extending member and a longitudinally extending member pivoted at one end to the transversely extending member, said member adapted to extend under parts of the vehicle to support the same, the towing connection to said frame engaging the longitudinally extending member between the ends thereof.

3. An automobile towing frame which comprises a transversely extending member adapted to extend under and support the springs of the automobile at one end thereof, a longitudinally extending member pivoted at one end to the transversely extending member and extending beneath the axle, means on said transversely extending member to engage the axle, and means on the longitudinally extending member located between vertical lines passing through the ends thereof for connecting the towing apparatus to the frame.

4. An automobile towing frame which comprises a cross yoke bar extending across the automobile at the end and adapted to engage with the springs of the automobile, a longitudinally extending member pivoted at one end to the cross yoke bar and extending rearwardly under the axle, clamping members on said longitudinally extending member to engage the axle, a rearwardly extending portion on the front end of the longitudinally extending member, and means on said portion whereby the towing connection can be made thereto.

5. An automobile towing frame which comprises a cross yoke bar extending across in front of the automobile, the ends of said bar inclined downwardly, and a spring rest bracket adjustably supported on each end of the bar, said brackets being inclined at 90° with respect to the ends of the bar.

6. An automobile towing frame which comprises a frame supporting the end of the automobile, and inclined spring rests on said frame engaging with the springs of the automobile to support them.

HENRY M. HOLT.